Figure 3:
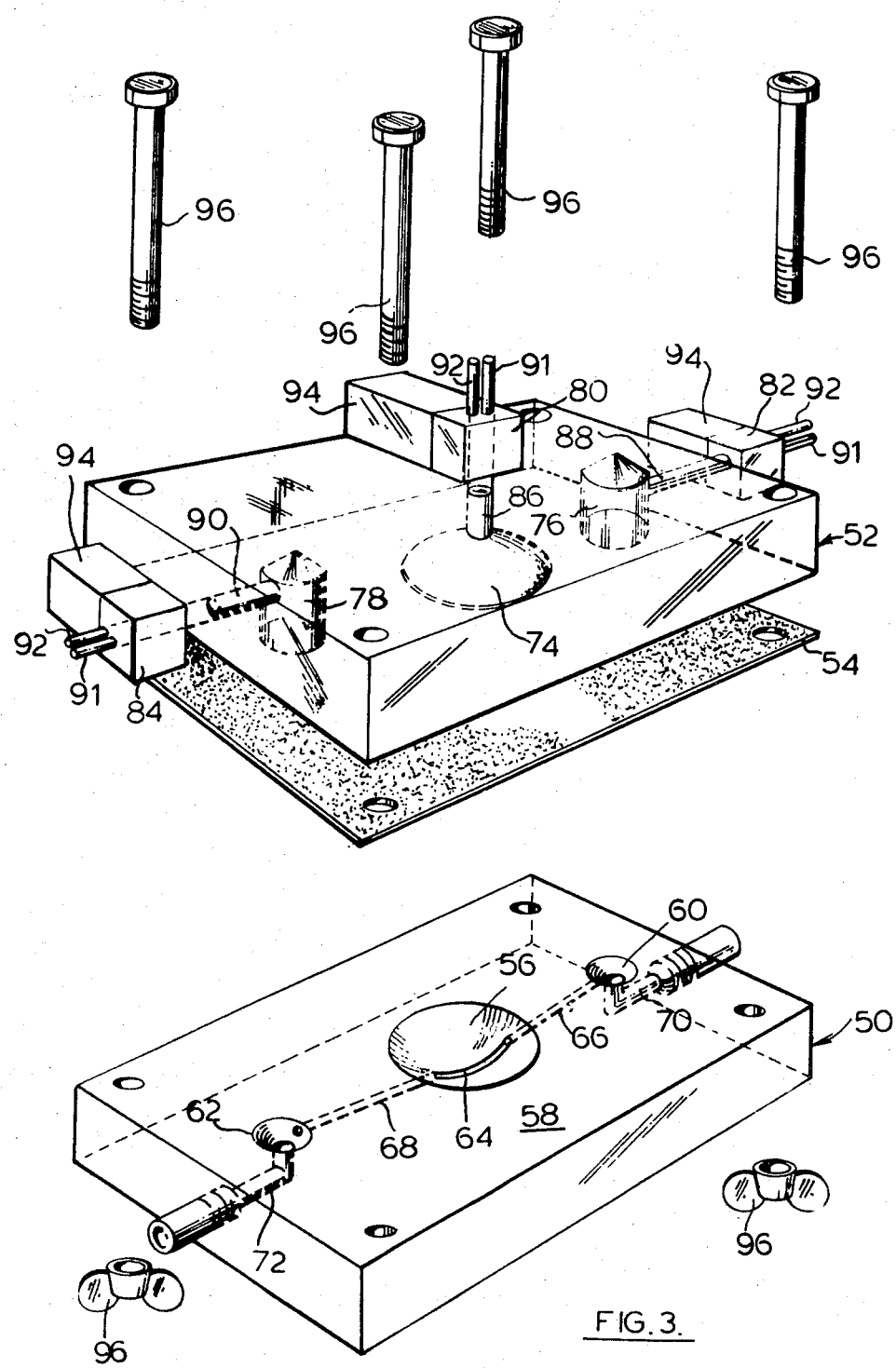

United States Patent [19]
Nystroem

[11] 3,741,687
[45] June 26, 1973

[54] JET-ACTUATED MEMBRANE PUMP
[76] Inventor: Ernst Holger Bertil Nystroem, P.O. Box 7, 1195 Dully/Bursinel, Switzerland
[22] Filed: Apr. 5, 1971
[21] Appl. No.: 131,055

[30] Foreign Application Priority Data
Apr. 15, 1970  Great Britain ............... 17,844/70

[52] U.S. Cl. ............................ 417/317, 417/395
[51] Int. Cl. ........................ F04b 35/02, F04b 43/06
[58] Field of Search ................. 417/398, 317, 326, 417/375, 379, 383, 384, 389, 390, 479, 507, 395

[56]  References Cited
UNITED STATES PATENTS

| | | | |
|---|---|---|---|
| 2,732,807 | 1/1956 | Parsegian | 417/317 |
| 3,318,324 | 5/1967 | Ruth | 417/390 |
| 2,383,193 | 8/1945 | Herbert | 417/395 X |
| 2,529,028 | 11/1950 | Landon | 417/395 X |
| 2,980,032 | 4/1961 | Schneider | 417/395 X |
| 3,307,481 | 3/1967 | De Castelet | 417/395 X |
| 3,533,387 | 10/1970 | Kaneko | 417/395 X |
| 862,867 | 8/1907 | Eggleston | 417/395 X |

*Primary Examiner*—William L. Freeh
*Assistant Examiner*—John T. Winburn
*Attorney*—Beveridge & DeGrandi

[57]  ABSTRACT

The invention relates to a pump having a reservoir having an inlet thereto and an outlet therefrom, and a membrane defining at least part of one wall of the reservoir and movable alternately to draw fluid into the reservoir through the inlet and to expel fluid from the reservoir through the outlet, a membrane serving to open and close the inlet and a membrane serving to open and close the outlet. One or more membranes may be used and the or each membrane is preferably movable in response to changes in fluid pressure on the opposite side thereof to the reservoir.

9 Claims, 5 Drawing Figures

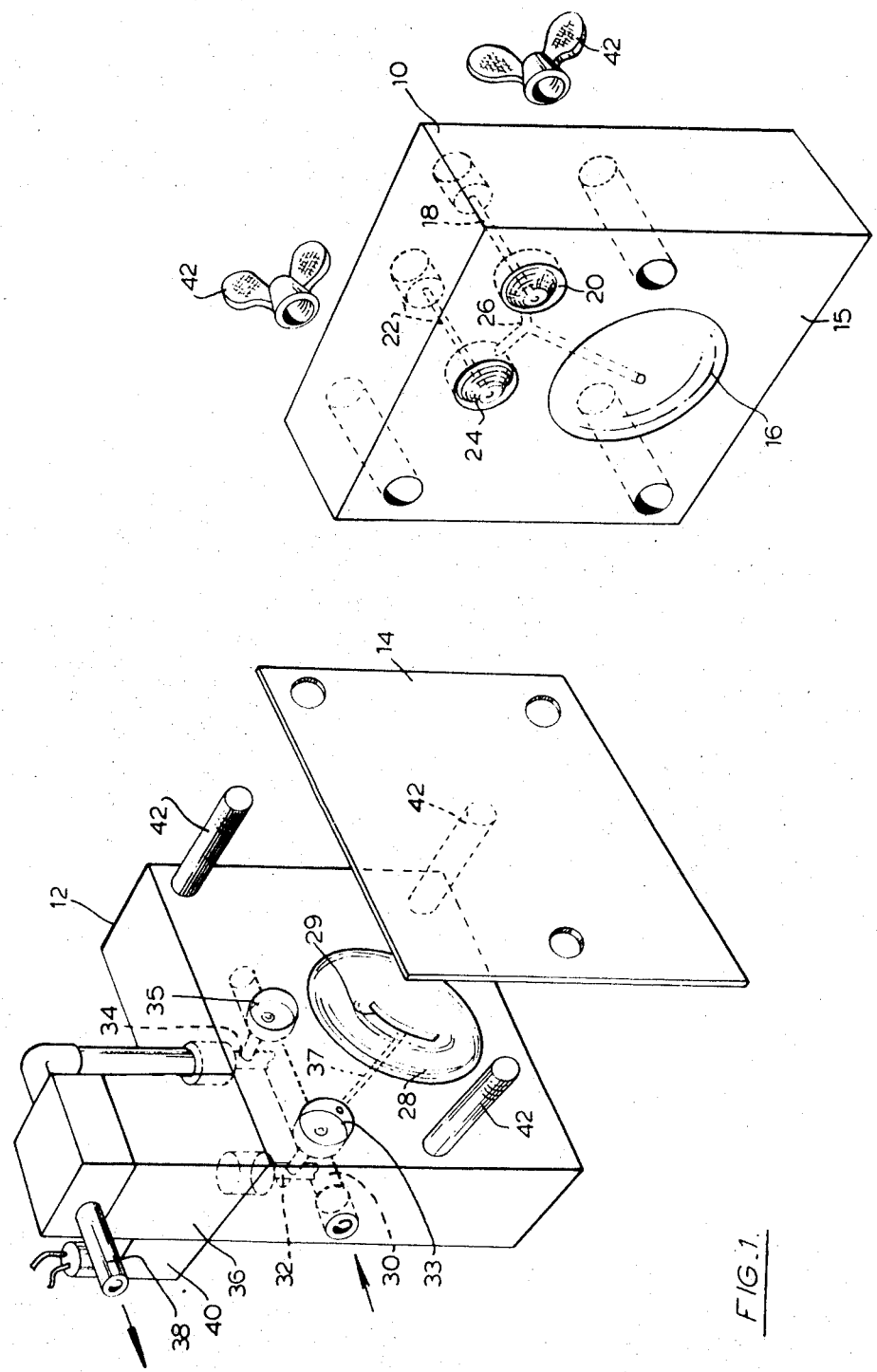

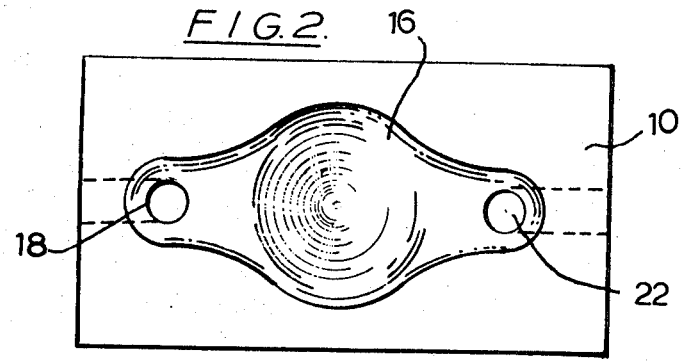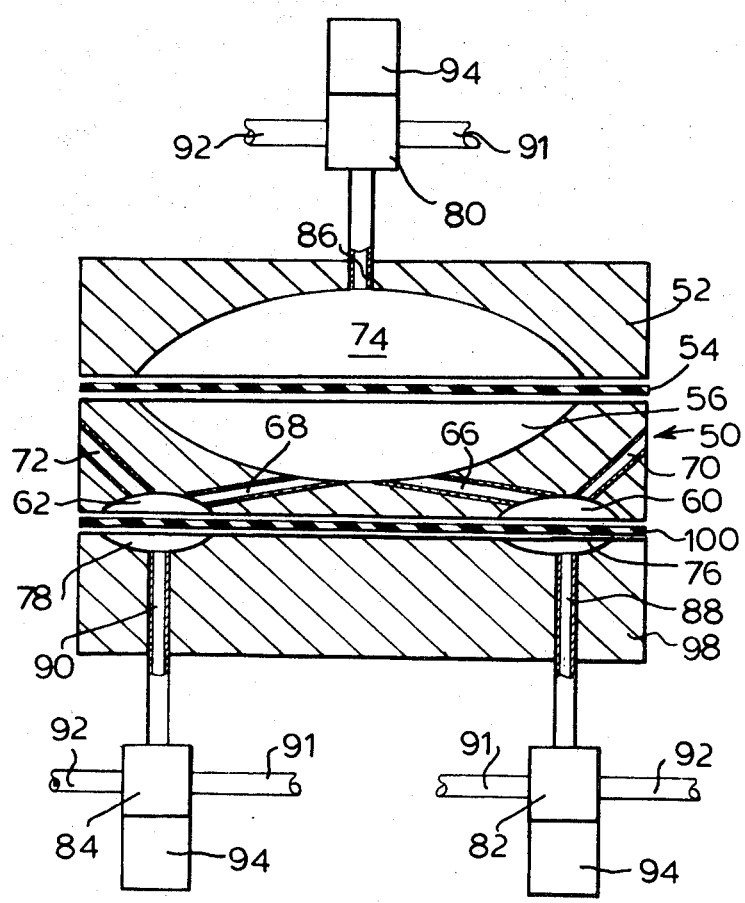

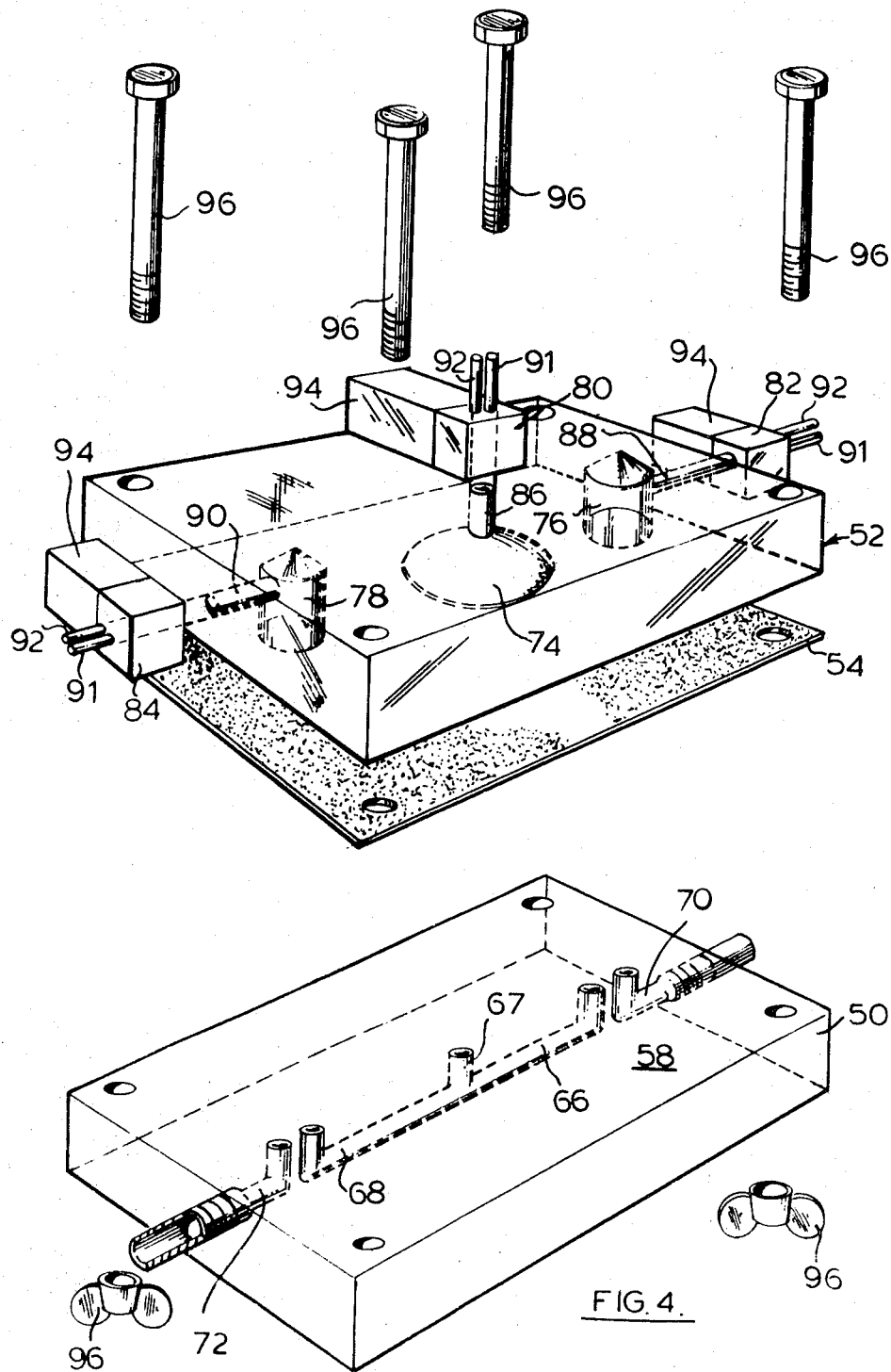

JET-ACTUATED MEMBRANE PUMP

The present invention relates to a pump.

According to the present invention a pump comprises a reservoir having an inlet thereto and an outlet therefrom, a membrane defining at least part of one wall of the reservoir and movable alternately to draw fluid into the reservoir through the inlet and to expel fluid from the reservoir through the outlet, a membrane movable to open and close the inlet and a membrane serving to open and close the outlet.

One or more membranes may be used to define at least part of one wall of the reservoir and to open and close the inlet and the outlet.

The membrane is preferably movable in response to changes in fluid pressure on the opposite side thereof to the reservoir. The fluid pressure may be for example oil pressure, air pressure water pressure etc.

In one preferred embodiment of the invention the pressure applied to the membrane is created by one or more (preferably two) jet pumps.

In applications where the fluid being pumped is to be added to a flow of another fluid, that other fluid may be the jet medium in the jet pump.

The changes in pressure are preferably achieved by alternately raising and lowering the pressure on the opposite side of the membrane to the reservoir in areas opposite the reservoir, the inlet and the outlet.

The pressure required on the opposite side of the membrane during pressurisation and depressurisation depends upon the use to which the pump is being put. If the inlet of the pump receives a liquid of a certain pressure then the depressurisation-pressure must be below that pressure of the liquid. For instance if water is to be pumped and the water level is at atmospheric pressure and placed 2 metres below the inlet to the pump then depressurisation-pressure must be less than 0.8 of the atmospheric pressure in theory and in practice still somewhat less. This is to overcome the suction to the pump. On the other hand if the liquid at the inlet has a pressure of 2 kg/cm² then the depressurisation-pressure can be more than the atmospheric pressure and up close to but less than 2 kg/cm².

In addition the pressurisation-pressure must be higher than the pressure of the liquid at the outlet of the pump.

The selective pressurisation and depressurisation of the compartments can be controlled by various methods e.g. by the use of valves (usually solenoid valves) and timers or in an especially preferred embodiment by using the well known techniques of fluid logics (or fluidics). The present invention thus envisages a valve of the types described, in which the compartments are pressurised and depressurised using fluidistor technology.

In one arrangement the reservoir is formed as a hollowed out portion in a solid member. Two further hollowed out portions or cavities are also formed in the solid member (in the same face as the reservoir or in an opposite face) and are connected to the reservoir by passages. The further hollowed out portions also have additional passageways leading thereto for connection to a source of fluid and to a delivery point. Fluid is caused to flow by alternately and sequentially raising and lowering the pressure in areas on the opposite side of the membrane to the three hollowed out portions or cavities.

By arranging a smooth or streamlined path for the fluid being pumped through the pump a low turbulence pump may be obtained. Such a pump is of great value in pumping blood through a human body. Other uses of the pump of the present invention include laboratory pumps and pumps for supplying chemicals for example the addition of chemicals to swimming pools and the addition of fertilizer in water for watering plants.

The invention will now be further described by way of example with reference to the accompanying drawings, in which:

FIG. 1 of which is an exploded view of a pump embodying one form of the present invention, FIG. 2 is a plan view of a part of a pump embodying an alternative form of the invention, FIG. 3 is an exploded view of a pump embodying another form of the present invention, FIG. 4 is an exploded view of a pump embodying a further form of the invention, and FIG. 5 is a cross-sectional view of a pump embodying yet a further form of the invention.

Referring now to FIG. 1 the pump shown comprises two solid members 10 and 12 between which is located a membrane 14. For clarity member 10 is rotated slightly with respect to member 12 and membrane 14 in order to clearly show front face 15. The member 10 includes a reservoir 16 which is formed as a cavity in the face 15 of the member 10. An inlet passageway 18 extends between the front and back faces of the member 10 and is surrounded by an annular channel 20 formed in the front face 15 of the member 10. A similar arrangement comprising an outlet passage 22 and an annular channel 24 is also provided in the member 10. A series of passageways 26 connects each of the annular channels 20, 24 with the reservoir 16. The member 12 is formed with a cavity 28 which will lie opposite the reservoir 16 when the pump is assembled. A blind passageway 30 extends into the member 12 and a pair of jet pumps 32, 34 are connected to the blind passageway 30. The area downstream of the restrictions in the jet pumps 32, 34 are connected to cavities 33, 35 respectively formed in the front face of member 12. The cavity 33 is in communication with the cavity 28 via a very narrow bore passageway 37. A slot 29 is formed in the wall of the cavity 28 and the passageway 37 is connected to this slot 29. A three-way valve arrangement 36 (shown diagrammatically) selectively connects either jet pump 32 or jet pump 34 with an outlet pump 38. The three-way valve is operated by a timer 40 (shown diagrammatically).

In the arrangement shown the members 10 and 12 and the membrane 14 are held together e.g. by nuts and bolts 42.

In operation jet pump 32 is first connected to outlet pipe 38 and a jet medium is flowed through passageway 30 and jet pump 32 to outlet 38. An area of low pressure is thereby created within the chamber 33. This draws membrane 14 away from inlet passage 18 thereby opening the inlet and at the same time creating an area of low pressure around the inlet. The low pressure draws the fluid to be pumped through the inlet 18 from a supply (not shown) and into the annular channel 20. The passageway 37 which connects chamber 33 with chamber 28 is of extremely small cross-section and creates a low pressure area within chamber 28 shortly after the creation of the low pressure area in the chamber 33. The low pressure in chamber 28 draws membrane 14 into chamber 28 thereby expanding reservoir 16 and drawing fluid from channel 20 through passageway 26 into the reservoir 16. During this period build up of fluid in passage 30 to the right of jet pump 33 as viewed creates an area of high pressure in chamber 35 which acts on the membrane 14 to keep outlet passage 22 closed. The three-way valve under operation of the timer 40 then connects jet pump 34 to outlet pipe 38 and simultaneously disconnects jet pump 32 from outlet pipe 38. This creates an area of low pressure in chamber 35 which draws the membrane into chamber 35 at that point. The annular channel 24 is thus subjected to a reduction in pressure thereby causing fluid to be drawn through passageway 26 from reservoir 16 into annular channel 24. Build up of fluid within passageway 30 now creates an area of high pressure in chamber 33 which by action of the membrane 14 closes inlet passageway 18. By virtue of the connection between chambers 28 and 33, an area of high pressure is created within chamber 28 shortly following the creation of the area of high pressure in chamber 33. This area of high pressure in chamber 28 forces membrane 14 into reservoir 16 expelling fluid from reservoir 16 through passageway 26 into annular channel 24 and subsequently through outlet passageway 22. Under control of the timer the three-way valve continuously alternates the connection of outlet pipe 38 between jet pumps 32 and 34 in a pulsating manner and thereby creates a pumping effect through the reservoir 16.

The members 10 and 12 may be replaced by an arrangement in which flow from the inlet 18 to the outlet 22 through the reservoir is streamlined flow or at least flow of very low turbulence. Such an arrangement is shown in FIG. 2. In this arrangement the path between inlet 18 through reservoir 16 to outlet 22 is smoothed out by the shape of the cavity formed in member 10. Clearly with this arrangement the arrangement of block 12 will have to be adjusted accordingly.

Referring now to FIG. 3, the pump shown comprises two solid members 50, 52 between which is located a membrane 54. The member 50 includes a reservoir 56 formed as a cavity in face 58 of the member 50. Two smaller cavities 60, 62 are also formed in the face 58 of the member 50. A slot 64 is formed in the wall of the reservoir 56 and passages 66, 68 connect the slot 64 with cavities 60 and 62 respectively. Cavities 60 and 62 are provided with further passageways 70, 72 respectively connecting these cavities to the side faces of the member 50.

The member 52 is provided with three cavities 74, 76, 78 which are exactly opposite cavities 56, 60 and 62 respectively when the pump is assembled. The cavities 74, 76, 78 are connected with valves 80, 82, 84 respectively by passages 86, 88, 90. The valves 80, 82, 84 can selectively connect passageways 86, 88, 90 with a source of either vacuum or pressure via conduits 92. Each of the valves 80, 82, 84 is controlled by means of a timer 94. The two solid members and the membrane may be held together by nuts and bolts 96.

In operation the valves are co-ordinated so that at any one time cavity 74 is in the same condition (i.e. connected with a source of pressure or vacuum) as one of the other cavities 76 and 78. The operation will be described by reference to the case where cavity 74 is in the same condition as cavity 78. Starting from the condition in which valves 80 and 84 connect passageways 86 and 90, and thus the cavities 74 and 78, with a source of pressure so that the passage 72 is closed and the volume of the reservoir 56 is minimised, and in which valve 82 connects passageway 88 and thus cavity 76 with vacuum so that passageway 70 is open, the sequence of operation is as follows:

Under the influence of the timer 94 the positions of the three valves are reversed thereby connecting the passages 86 and 90 with a source of vacuum and the passage 88 with a source of pressure. The passageway 70 is thereby closed, the passageway 72 opened and the volume of the reservoir 56 increased. During this part of the operation fluid is drawn in through passageway 72 and passes through cavity 62 and passageway 68 to the reservoir 56. The timers again reverse the position of the three valves and thereby closing the passageway 72, and opening the passageway 70. The volume of reservoir 56 is decreased and fluid present in the reservoir 56 is passed via passageway 66 and cavity 60 to the passageway 70. In order to achieve a very smooth pumping action or if the reservoir 56 is small then the action of valve 80 may be slightly delayed with respect to valve 84.

The pump shown in FIG. 4 is the same as that of FIG. 3 with the exception that the cavities 56, 60, 62 are omitted and the passageways 66, 68, 70, 72 extend to the surface 58 of the member 50. In this arrangement the reservoir thus comprises the passageways 66 and 68 (which are joined together and include a common portion 67) and the volume between the membrane 54 and the surface 58 created when the membrane is drawn into cavity 74. In this arrangement the capacity of the pump may be brought up to that of the pump of FIG. 3 or altered in any other way by altering the volume of the cavity 74. The advantage of this arrangement is that the member 50 may be reduced in size. The member 50 is one of the components which comes into contact with the fluid being pumped and which must be made from a material which is inert to the fluid being pumped. Such materials may well be expensive (e.g. if Teflon is used) and the reduction in size of member 50 thus enables economies in cost. The other component which comes into contact with the fluid being pumped is the membrane. This may conveniently be made from Viton.

The arrangement shown in FIG. 5 is similar to that shown in FIG. 3 with the exception that cavities 60, 62 are formed in the opposite face of member 50 to the reservoir 56 and cavities 76, 78 are formed in a third member 98 separated from member 50 by a second membrane 100. Operation of the pump of FIG. 5 is the same as described in connection with FIG. 3.

If desired either cavities 76, 78 or cavities 60, 62 may be omitted.

This arrangement ie. that of FIG. 5 may provide smoother flow than the arrangements of FIGS. 1, 3 and 4.

In the arrangements of FIGS. 3, 4 or 5 where the pump is being used for dosing swimming pools, the suction from the circulating pump normally used in the pool may be utilised to provide the source of vacuum for the valves 80, 82, 84 and the outlet pressure from the circulating pump may be used as the source of pressure for the valves 80, 82, 84.

The timers mentioned above may be either electronically or mechanically operated. Electronically controlled timers include for instance the triac and thyristor equipped timers and their frequency in switching is varied by one or more potentiometers. Mechanically operated switches include for instance motor-operated switches and the frequency can be varied by varying the speed of the motor.

It will be appreciated that many modifications of the arrangements shown in the drawings may be effected. For example in the arrangement shown in FIG. 3 the valve 80 may be omitted and the passageway 86 connected with either the passageway 88 or the passageway 90 depending upon the desired direction of pumping. By arranging the connection between the passageway 86 and either the passageways 88 or 90 to be much smaller than passageway 86 or 84 a similar effect to delaying the action of valve 80 may be achieved. A delaying effect could also be achieved by locating a valve in the connection between passageway 86 and either the passageway 88 or the passageway 90, which valve is arranged to open only in one direction and only when a predetermined pressure has been reached. This predetermined pressure can be chosen such that the inlet to the pump is always either opened or closed before the predetermined pressure is reached at this valve.

A further possible modification of the arrangements of FIGS. 1 to 3 involves the omission of the three cavities in one or other of the member 10 and 12 or in member 52. In this event the capacity of the pump will be reduced unless the cavity 56, 16 or 28 on the other side is correspondingly increased in volume.

In a further modification the members 10 and 12 or 50 and 52 may be other than flat e.g. they may be curved, spherical or angled.

If desired the membrane need extend only just beyond the area of the cavities and need not cover the whole area between the members 50, 52 or 50, 54.

In all the arrangements described in the drawings the pressurisation and depressurisation is controlled by valves (usually solenoid valves) operated by timers. The timer and/or the valve may if desired be replaced by an arrangement employing fluidics (fluid logics) techniques i.e. employing fluidistor technology.

The capacity of the pump of the invention depends inter alia upon how often the timers switch per period of time. Each time the pump reservoir decreases in volume the pump liquid is pressed out from the pump and each time the pump reservoir increases in volume this is interrupted. In many cases this pulsing action of the pumping is of no importance. To achieve a smoother pumping action it is possible to equip the pump wth two or more co-operating pump reservoirs each one with its own inlet and outlet membrane valve.

I claim:

1. A pump comprising a reservoir, an inlet to said reservoir and an outlet from said reservoir, a pumping membrane defining at least part of one wall of the reservoir and movable alternately to draw fluid into the reservoir through the inlet and to expel fluid from the reservoir through the outlet, means including a first jet pump for moving the pumping membrane by alternately subjecting the face thereof which lies opposite the reservoir to fluid pressure and vacuum, a first valving membane movable to open and close the inlet, a second valving membrane movable to open and close the outlet, said first jet pump being operable on the first valving membrane to move it between its opening and closing positions by alternately subjecting one face thereof to fluid pressure and vacuum, and means including a second jet pump for alternately subjecting one face of the second valving membrane to fluid pressure and vacuum to move the second valving membrane to its opening position when the first valving membrane is in its closing position and to move the second valving membrane to its closing position when the first valving membrane is in its opening position.

2. A pump according to claim 1, wherein a single membrane defines at least part of one wall of the reservoir, serves to open and close the inlet and serves to open and close the outlet.

3. A pump according to claim 1, wherein each membrane is movable in response to changes in fluid pressure on the opposite side thereof to the reservoir.

4. The pump of claim 1 having valve means for intermittently obstructing the flow of fluid leaving each of the jet pumps, whereby the jet pump creates a vacuum on the face of its respective membrane when the valve means is open and the jet pump exerts a pressure on the face of its respective membrane when the valve means is closed.

5. A pump according to claim 1, wherein the reservoir is formed as a hollowed out portion in a solid member, at least two further hollowed out portions also being formed in the solid member, said further hollowed out portion being connected to the reservoir and to exterior walls of the solid member by passageways, a membrane extending across the reservoir and each of the at least two further hollowed out portions.

6. A pump according to cliam 5 wherein the hollowed out portions, corresponding to the reservoir and the at least two further hollowed out portions, are formed in at least one further solid member located on the opposite side of a membrane to the reservoir and the at least two further hollowed out portions in the first solid member.

7. A pump according to claim 5, wherein the reservoir is formed in an opposite face of the solid member to said at least two further hollowed out portions, and a first membrane defines at least part of one wall of the reservoir and a second membrane serves to open and close the inlet and the outlet.

8. A pump according to claim 6, wherein the reservoir is formed in an opposite face of the solid member to said at least two further hollowed out portions, and a first membrane defines at least part of one wall of the reservoir and a second membrane serves to open and close the inlet and the outlet.

* * * * *